United States Patent
Itoh et al.

[11] Patent Number: 5,856,859
[45] Date of Patent: Jan. 5, 1999

[54] GUEST-HOST REFLECTIVE LIQUID CRYSTAL DISPLAY DEVICE WITH A PARTICULAR RELATIONSHIP BETWEEN THE CONCENTRATION OF DICHROIC DYE AND THE CELL THICKNESS

[75] Inventors: Yasuhisa Itoh, Tenri; Naofumi Kimura, Nabari, both of Japan

[73] Assignee: Sharp Kabushiki Kaisha, Osaka, Japan

[21] Appl. No.: 887,202

[22] Filed: Jul. 2, 1997

[30] Foreign Application Priority Data

Jul. 18, 1996 [JP] Japan ..................... 8-187965

[51] Int. Cl.$^6$ ..................... C09K 19/60
[52] U.S. Cl. ..................... 349/165; 349/179
[58] Field of Search ..................... 349/165

[56] References Cited

U.S. PATENT DOCUMENTS

| | | | |
|---|---|---|---|
| 4,527,864 | 7/1985 | Dir | 350/337 |
| 5,408,345 | 4/1995 | Mitsui et al. | 359/59 |
| 5,453,217 | 9/1995 | Keneko et al. | 252/299.1 |

FOREIGN PATENT DOCUMENTS 6-234975  8/1994  Japan .

Primary Examiner—William L. Sikes
Assistant Examiner—Robert J. Hollingshead
Attorney, Agent, or Firm—Dike, Bronstein, Roberts & Cushman,LLP; David G. Conlin

[57] ABSTRACT

A reflective liquid crystal display device includes a pair of substrates and a liquid crystal layer interposed therebetween. The liquid crystal layer includes a liquid crystal material and a dichroic dye contained therein, and long axis of liquid crystal molecules near the substrate is substantially parallel to the substrate. A plurality of parameters of the reflective liquid crystal display device are set so that a product $K_M cd$ of a value $K_M$, a dye concentration c and a thickness d of the liquid crystal layer satisfies the following relationship:

$$3.0S^2 - 7.3S + 5.7 \leq K_M cd \leq 14.7S^2 - 15.1S + 6.15$$

wherein, the value $K_M$ is a value defined by absorption coefficients for linearly-polarized light substantially parallel to and perpendicular to the liquid crystal molecules, and an order parameter S of the liquid crystal layer.

2 Claims, 3 Drawing Sheets

GUEST-HOST REFLECTIVE LIQUID CRYSTAL DISPLAY DEVICE WITH A PARTICULAR RELATIONSHIP BETWEEN THE CONCENTRATION OF DICHROIC DYE AND THE CELL THICKNESS

BACKGROUND OF THE INVENTION

1. Field Of The Invention

The present invention relates to a reflective liquid crystal display device which realizes a bright display.

2. Description Of The Related Art

A liquid crystal display device is a non-light-emitting device which conducts a display by modulating light ambient and incident upon the device. Therefore, power consumption in a liquid crystal display device is low. Moreover, it is thin and lightweight. Having such excellent characteristics, it has been widely used in information display apparatuses such as watches, calculators, computer terminals, word processors, TVs and the like.

In recent years, as represented by the coined phrase "advanced information society", an ever-increasing amount of information has been distributed and circulated. Accordingly, there has been an increasing demand by individuals for personal collection and selection of information. Under such a circumstance, there has been a widely recognized need for a portable information apparatus for personal use such as a PDA. Such an apparatus has been longed for and is now positively developed.

In such a portable information apparatus, an information display device as a man-machine interface plays an important role and is considered the key device for the apparatus. Such a display device of the portable information apparatus is required to be thin, light weight, capable of displaying a great volume of information, superior in visibility, and low in power consumption. A liquid crystal display device has been developed which is expected to meet these requirements.

Particularly, a reflective liquid crystal display device can be a suitable display device since it efficiently uses ambient light, thereby sufficiently exhibiting a low power consumption characteristic which is inherent in liquid crystal display devices.

However, when TN or STN mode, the currently preferred display modes, is employed in a reflective liquid crystal display device which incorporates no backlight, two polarizers are required to be provided in the device; hereby resulting in a dark display. Therefore, the TN or STN mode can be employed only in a black and white reflective liquid crystal display device, but it has not been employed in a color reflective liquid crystal display device, since a color reflective liquid crystal display device has to be necessarily provided with a color filter as well as the polarizers and, therefore, a practical brightness cannot be achieved.

Thus, conventionally, a guest-host mode (also referred to as the "GH mode", hereinafter) has been mainly employed in the color reflective liquid crystal display device. In this display mode, a dichroic dye is dissolved in a liquid crystal material as a solvent, and a display is conducted utilizing the anisotropy of the absorption coefficient of the dichroic dye. Thus, a color display can be realized, without any polarizer or color filter, by controlling the orientation of the liquid crystal molecules with an applied electric field and thereby simultaneously changing the orientation of the dye molecules.

For a conventional reflective GH display device, improvement of display characteristics such as contrast and brightness of the display has been discussed while simplifying the manner the liquid crystal molecules are oriented in the presence or absence of an applied voltage. However, the improvement of the characteristics may not have been adequately discussed based on the conventional theory since, in practice, the orientation of the liquid crystal molecules changes in a more complicated manner as a voltage is applied in an actual liquid crystal display device.

SUMMARY OF THE INVENTION

According to one aspect of this invention, a reflective liquid crystal display device includes: a pair of substrates; and a liquid crystal layer interposed between the pair of substrates, where the liquid crystal layer is formed of a liquid crystal material having a positive dielectric constant anisotropy, the long axis of molecules of the liquid crystal material near the substrate is substantially parallel to the substrate, and the liquid crystal material contains a dichroic dye mixed therein. A product $K_M cd$ of a value $K_M$, a dye concentration c % and a thickness of the liquid crystal layer d μm is set so as to satisfy the following expression.

$$3.0S^2 - 7.3S + 5.7 \leq K_M cd < 14.7S^2 - 15.1S + 6.15$$

Herein, the value $K_M$ is expressed as:

$$K_M = 3k_1/(1+2S)$$

or $$K_M = 3k_2/(1-S),$$

where $k_1$ denotes an absorption coefficient for linearly-polarized light substantially parallel to the liquid crystal molecules; $k_2$ denotes an absorption coefficient for linearly-polarized light substantially perpendicular to the liquid crystal molecules; and S denotes an order parameter of the liquid crystal material containing the dichroic dye mixed therein, and where an effective value of a voltage applied across the liquid crystal layer is in a range of about 0 to 5 V.

In one embodiment of the invention, a chiral material spontaneously having a twisted structure is added to the liquid crystal material, whereby the liquid crystal layer has a twisted structure.

Hereinafter, the functions of the present invention resulting from such a configuration will be described.

In the reflective liquid crystal display device designed so that the product $K_M cd$ of the value $K_M$, the dye concentration c % and the thickness of the liquid crystal layer d μm satisfies the aforementioned relationship, a display with high brightness and high contrast can be realized. Moreover, by specifying the range of physical property values with which the optimal brightness and high contrast can both be realized, there is provided an increased freedom in designing the reflective liquid crystal display device, thereby facilitating such design.

Furthermore, by adding the chiral material to the liquid crystal material, it is possible to realize a display with even higher contrast since light can be more efficiently absorbed in the absence of an applied voltage.

Thus, the invention described herein makes possible the advantage of providing a reflective liquid crystal display device with excellent display quality while optimizing parameters so as to compatibly realize high brightness and high contrast through a detailed examination of how the liquid crystal molecules are oriented and how the dichroic dyes are oriented in the presence and absence of an applied voltage.

This and other advantages of the present invention will become apparent to those skilled in the art upon reading and understanding the following detailed description with reference to the accompanying figures.

DESCRIPTION OF THE PREFERRED EMBODIMENTS

Figure 1:
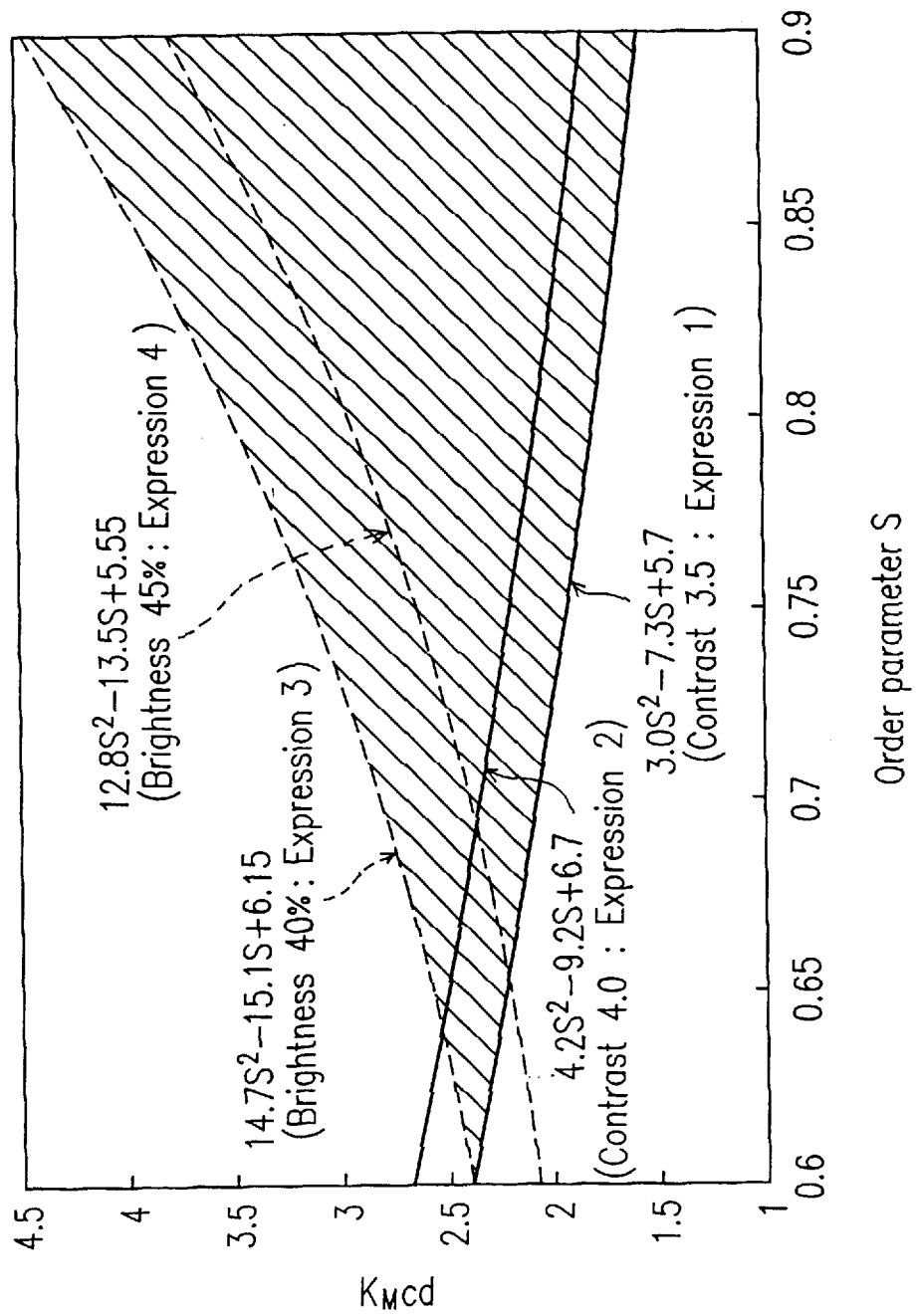
FIG. 1 is a graph showing the optimal range of the value $K_M cd$ and the order parameter S according to the present invention.

First, the principle of the present invention will described.

In a reflective liquid crystal display device, brightness and contrast are in a trade-off relationship with respect to each other. That is, when brightness is favored over contrast, contrast may consequently be low. Similarly, when contrast is favored over brightness, the display may consequently be dark. This similarly applies to the GH display mode, in which contrast and brightness are determined by the dye concentration. That is, generally, as the dye concentration is increased, high contrast cannot be obtained.

Generally, the transmission T of a medium which contains a dye and therefore absorbs light is a function of the absorption coefficient $\alpha$ $[/\mu m]$ of the dye, the dye concentration c [%] and the thickness d $[\mu m]$ of the medium. The transmission T can be expressed by the following expression.

$$T = e^{-acd}$$

In the GH display mode, light is absorbed basically based on the principle as expressed by the above expression. However, since dyes typically used for the GH display mode exhibit dichroism and are dissolved in the liquid crystal material, the molecule orientation thereof is complicated. Moreover, in the GH display mode, the absorption coefficient $\alpha$ is a function of the order parameter S, which greatly influences the display. That is, for a given dye, the transmission T is a function of the dye concentration, the cell thickness and the order parameter.

When $K_M$ $[/\mu m]$ denotes the magnitude of the transition moment of the dye; c [%] denotes the dye concentration; d $[\mu m]$ denotes the thickness of the liquid crystal layer; and S denotes the order parameter of the liquid crystal material containing the dye mixed therein, and the transition moment of the dye is assumed to be parallel to the long axis of the dye molecules, the absorption coefficients $K_1$ and $k_2$ (respectively for linearly-polarized light having a polarization parallel to the long axis direction of the dye molecules and linearly-polarized light having a polarization perpendicular thereto) can be expressed as follows.

$$K_1 = K_M(1+2S)/3$$

$$K_2 = K_M(1-S)/3$$

Theoretically, the transition moment of the dye molecules makes a certain angle with respect to the long axis of the dye molecules, and thus the transition moment has some rotational freedom with respect to the long axis of the dye molecules. Therefore, the transition moment of the dye molecules has to be discussed based on the spatially averaged value thereof. However, for dichroic dyes acceptable for practical use, e.g., for both an azo-containing dye and an anthraquinone-containing dye, the angle between the long axis of the dye molecules and the transition moment thereof is small. Moreover, in practice, the absorption coefficient is typically discussed as a value for parallel or perpendicular light with respect to the director of the liquid crystal material. Accordingly, the transition moment is herein assumed to be parallel to the long axis of the dye molecules.

Figure 3:
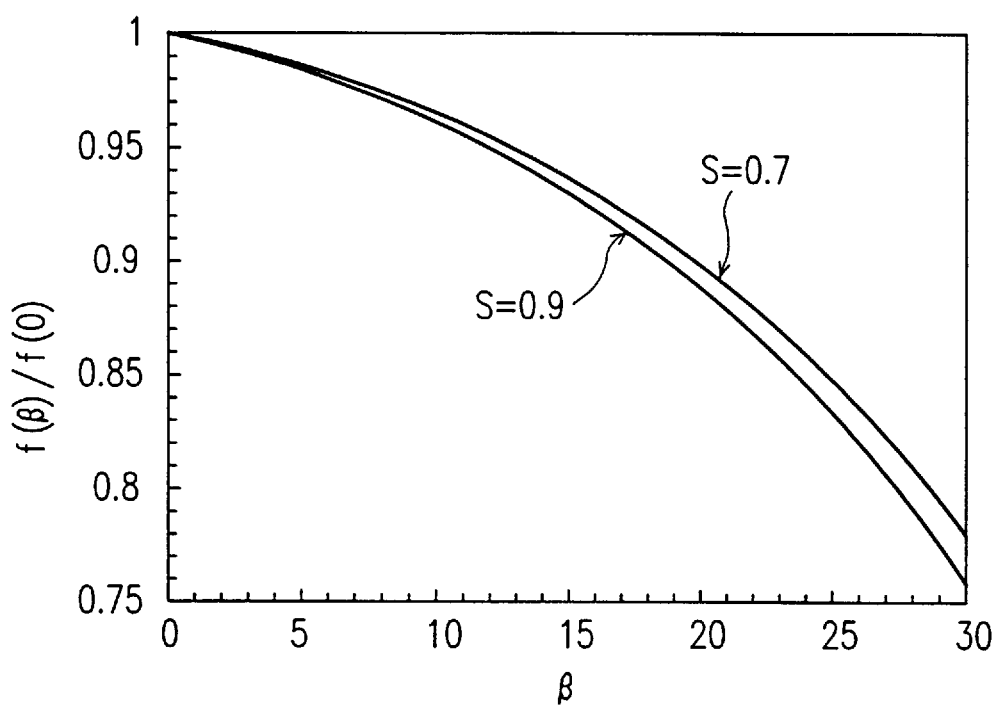
FIG. 3 is a graph showing changes in the absorption coefficient with respect to the angle between the transition moment and the long axis of the dye molecules.

FIG. 3 shows the result of calculating the change in the absorption coefficient dependent upon the angle between the transition moment and the long axis of the dye molecules. In FIG. 3, the horizontal axis represents the angle $\beta$ between the transition moment and the long axis of the dye molecules, whereas the vertical axis represents the absorption coefficient of the dye molecules for linearly-polarized light having a polarization parallel to the long axis of the dye molecules. Herein, the value of the absorption coefficient is normalized with the value being 1 when $\beta=0$ (i.e., the transition moment of the dye is parallel to the long axis thereof). The absorption coefficient of the dye molecules is calculated based on the following expression.

$$f(\beta) = S \sin^2 \beta/2 + (1-S)/3 + S(2-3\sin^2 \beta)/2$$

The parameter in this expression is the order parameter S of the GH liquid crystal material when a dye is mixed therein. It can be seen from FIG. 3 that the difference in absorption coefficient is as small as 7% or less when the order parameter is not more than 0.9 as in the nematic phase liquid crystal materials and $\beta$ is set to be 15° or less so that the apparent order parameter is not too low for practical use. This suggests that, in practice, the transition moment of the dye can be assumed parallel to the long axis of the dye molecules.

When dichroic dye molecules are assumedly randomly oriented in a solution, the absorption coefficient $\alpha$ thereof can be expressed as follows.

$$\alpha = (2k_2 + k_1)/3$$

In a liquid crystal material, the dichroic dye molecules are oriented as the liquid crystal molecules are oriented, thus exhibiting dichroism. For example, the reflectance R of a GH liquid crystal display device where the liquid crystal molecules and the dichroic dye molecules are in a homogeneous alignment, can be expressed by the following expression for ambient light in the absence of an applied voltage.

$$R = \{e^{f(k1)} + e^{f(k2)}\}/2$$

where $f(x) = -2xcd$

Herein, it is assumed that the reflector of the GH liquid crystal display device preserves the polarization state of light. In practice, however, as the orientation of the liquid crystal molecules differs, the propagation condition of light within the liquid crystal material also differs and, accordingly, the effective value of absorption of light differs, whereby the value of the function f(x) also differs.

In view of the above-described principle, with respect to the contrast and brightness of a reflective GH liquid crystal display device, it is important to determine at what values the dye concentration c and the cell thickness d are respectively to be set. That is, by setting the product $K_M cd$ (of the magnitude $K_M$ of the transition moment of the dye, the dye concentration c, and the cell thickness d) to be large, the absorption of light increases and, accordingly, reflection can be sufficiently suppressed when conducting a black display in the absence of an applied voltage. Thus, satisfactory contrast can be obtained. However, when conducting a white display in the presence of an applied voltage, the display becomes dark due to the influence of the liquid crystal molecules near the surface of the alignment layer. The reason for this is as follows. When an ideally sufficient voltage is applied, the liquid crystal molecules are oriented to be substantially perpendicular to the substrate, and the dye molecules are accordingly directed in a direction substantially perpendicular to the substrate, whereby the absorption of light can be lessened. However, when the liquid crystal display device is driven by an active element such as TFTs during practical use, the effective value of the maximum voltage which can be applied is as low as about 5 V. When such a voltage is applied, the orientation of the liquid crystal molecules present near an alignment film remains to be parallel to the substrate, thereby absorbing light. Thus, it is suggested that the lower limit of $K_M cd$ should be set to the minimum value which permits the desired contrast to be obtained (i.e., the value is such that the desired contrast cannot be obtained if the dye concentration or cell thickness is decreased to any lower value).

Moreover, as the value $K_M cd$ is decreased, absorption of light decreases, whereby sufficient brightness is guaranteed when conducting a white display even if the liquid crystal molecules present in the vicinity of the display surface remain unoriented when a voltage is applied. However, when conducting a black display in the absence of an applied voltage, light is not sufficiently absorbed, whereby satisfactory contrast cannot be obtained. In view of this, the upper limit of $K_M cd$ should be set to the maximum value which permits the desired brightness to be obtained (i.e., the value is such that the desired brightness cannot be obtained if the dye concentration or cell thickness is increased to any higher value).

For a reflective GH liquid crystal display device, the inventors of the present invention also examined the values of brightness and contrast, and found the following. Regarding brightness which determines the upper limit of $K_M cd$, it is necessary to have a reflectance of about 40% or greater (more preferably about 45% or greater) as observed with the liquid crystal cell alone (not including a color filter and the like) in order to realize a black-and-white display and a color display. Similarly, regarding contrast which determines the lower limit of $K_M cd$, it is necessary to have contrast of about 3.5 or greater (more preferably about 4.0 or greater). The reason for the setting of contrast and brightness to such values is as follows.

For example, a research report (the technical research report of the Institute of Electronics, Information and Communication Engineers of Japan, Vol. 95, No. 526, p.p. 113 to 118), in which a psychophysical subjective evaluation was conducted for contrast and brightness in a reflective liquid crystal display device, showed that brightness and contrast are highly correlative to each other. That is, as the display is brighter, lower contrast is accepted and, similarly, as contrast is greater, lower brightness is accepted. The influence of contrast and brightness on the subjective evaluation is also discussed in this report. When brightness is set to be about 40%, for example, contrast of about 3.5 is at the boundary of the limit region of viewer's tolerance, which is statistically considered to be within the 95% fiducial interval.

For a display having brightness of about 40% and contrast of about 3.5, which is within the above fiducial interval, if the reflectance is increased to be about 45% or greater or contrast is increased to be about 4.0 or greater, it is possible realize an even more preferable characteristics which can be tolerated by nearly all viewers.

Moreover, regarding contrast, by setting contrast to be about 4.0 or greater as above, it is possible to suppress generation of color mixture when a color display is conducted using a micro color filter, and thereby to realize a display with high color reproduction.

Brightness is set to be about 40% in the above discussion because, in the present invention, standard brightness is set equal to or greater than the brightness of newsprint. In view of the fact that the brightness of newsprint is about 40 to 60%, the minimum necessary brightness is set to be about 40% in the present invention.

Considering the above facts as a whole, it was decided to design a reflective liquid crystal display device which satisfies a condition that brightness is about 40% or greater (more preferably about 45% or greater), and contrast is about 3.5 or greater (more preferably about 4.0 or greater). The term "brightness" used in this specification corresponds to the luminous reflectance "Yw" of a white image in the above research report, which is observed.

FIG. 1 illustrates, in a graph, the facts discussed above. In the figure, the effective applied voltage is assumed to be within the range of about 0 to 5 V. In the GH liquid crystal display device where the liquid crystal molecules and the dichroic dye molecules are in homogeneous alignment, as an applied voltage is increased, even the liquid crystal molecules near the substrate are raised while the dye molecules are simultaneously raised. Thus, the display becomes brighter. However, as an applied voltage is increased, the power consumption increases accordingly. This detracts from the feature of the low power consumption, which is inherent in the reflective liquid crystal display device. Moreover, when displaying a great volume of information, it is necessary to provide an active element such as a TFT or MIM for each pixel and to drive the liquid crystal display device using the active elements. In practice, the liquid crystal display device using the active elements is typically driven with the effective voltage of about 0 to 5 V being applied across the liquid crystal layer. Therefore, values for the parameters were determined while limiting the driving voltage to this range. The hatched region in FIG. 1 represents the range of $K_M cd$ and S which allows for a display with contrast of about 3.5 or greater and brightness of about 40% or greater in the reflective GH liquid crystal display device. Each parameter can be set within the range so that the desired display quality is realized. That is, when contrast is favored over brightness, the dye concentration c and the cell thickness d should be determined according to the order parameter S of the GH liquid crystal material used, while the value $K_M cd$ is set to the maximum value with which brightness of about 40% can be achieved.

To actually express the above-described range in an expression, a curve which satisfies contrast of about 3.5 is expressed as follows.

$$K_M cd = 3.0S^2 - 7.3S + 5.7 \tag{1}$$

Similarly, a curve which satisfies contrast of about 4.0 is expressed as follows.

$$K_M cd = 4.2S^2 - 9.2S + 6.7 \tag{2}$$

Moreover, a curve which satisfies brightness of about 40% is expressed as follows.

$$K_M cd = 14.7S^2 - 15.1S + 6.15 \quad (3)$$

Similarly, a curve which satisfies brightness of about 45% is expressed as follows.

$$K_M cd = 12.8S^2 - 13.5S + 5.55 \quad (4)$$

These curves of the expressions (1) to (4) are also shown in FIG. 1. Based on the results described above, in order to realize the characteristics of brightness of about 40% or greater and contrast of about 3.5 or greater, the dye concentration c and the cell thickness d should be set within the range defined by the following expression.

$$3.0S^2 - 7.3S + 5.7 \leq K_M cd \leq 14.7S^2 - 15.1S + 6.15$$

In order to realize the characteristics of 45% or greater brightness and 4.0 or greater contrast, the dye concentration c and the cell thickness d should be set within the range defined by the following expression.

$$4.2S^2 - 9.2S + 6.7 \leq K_M cd \leq 12.8S^2 - 13.5S + 5.55$$

(EXAMPLE)

Hereinafter, an example of the present invention will be described.

Figure 2:
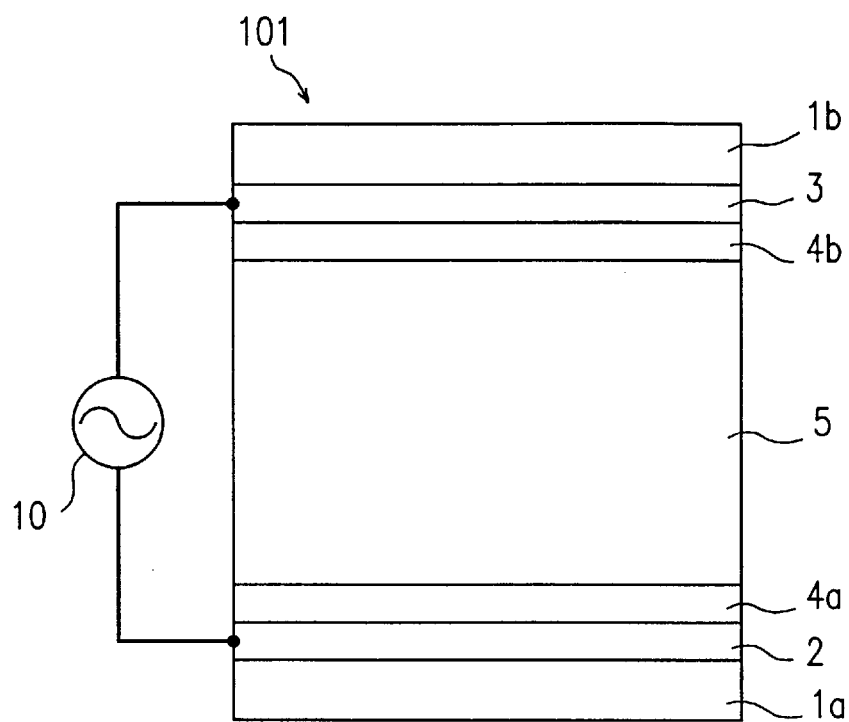
FIG. 2 is a schematic diagram illustrating a configuration of a liquid crystal display device according to an example of the present invention.

FIG. 2 is a cross-sectional view illustrating a configuration of a liquid crystal display device according to the example of the present invention.

Referring to FIG. 2, the liquid crystal display device of the present example includes transparent substrates 1a and 1b, the substrates opposing each other with a predetermined gap therebetween. A reflector 2, which also serves as display electrodes, and an alignment film 4a for aligning the orientations of liquid crystal molecules are provided on the substrate 1a. Similarly, on the substrate 1b, transparent electrodes 3 and an alignment film 4b are provided. A liquid crystal layer 5 is provided between the two alignment films 4a and 4b. The liquid crystal layer 5 includes a dichroic dye and a chiral material mixed therein. Here, the liquid crystal material which has positive dielectric anisotropy was used as a host material. The liquid crystal layer 5 absorbs light due to the dichroic dye, and spontaneously has a twisted structure due to the chiral material added thereto. Thus, light is efficiently absorbed in the absence of an applied voltage, whereby, when conducting a black display, the reflectance is suppressed to be sufficiently low. As a result, a high contrast display can be realized.

Modulation controller 10 for changing the orientation of the liquid crystal molecules is connected to the reflector 2 and the transparent electrodes 3, both of which also serve as display electrodes. The orientation of the liquid crystal molecules is controlled by an electric field, which is an external field caused by the applied display voltage, whereby the intensity of light passing through the liquid crystal layer 5 is modulated and controlled. By combining the GH liquid crystal display device of the twisted structure with the modulation controller 10 as described above, a liquid crystal display device 101 as an optical device capable of modulating the intensity light passing therethrough.

Hereinafter, an exemplary method for fabricating the liquid crystal display device having such a configuration will be described. A glass substrate about 1.1 mm in thickness (e.g., "7059": Corning Japan) is used as the substrates 1a and 1b. Aluminum is sputtered on the glass substrate 1a so as to form reflective electrodes. Minute concave/convex portions (not shown) are formed on the glass substrate 1a. The concave/convex portions are formed by, for example, roughening the surface of the glass substrate with an abrasive and then etching the surface with hydrofluoric acid. Through these steps, reflective electrodes having a scattering property are fabricated. Moreover, the electrode 3 is are formed by sputtering an ITO film on the transparent substrate 1b.

The alignment films 4a and 4b are formed by uniformly spin-coating polyimide ("SE-150": Nissan Chemical Ltd.), sintering the polyimide film, and then rubbing the film. The rubbing process is performed so as to achieve rubbing directions twisted by about 240° with respect to each other between the substrates 1a and 1b.

Thereafter, in order to maintain the gap between the substrates 1a and 1b unaltered, glass fiber spacers (not shown) with a grain diameter of about 5 $\mu$m are dispersed on one of the substrates 1a and 1b, and an adhesive sealing member containing fiber spacers with a grain diameter of about 5.3 $\mu$m mixed therein is screen printed as a sealing layer (not shown), thereby forming a sealing portion, after which the two substrates are attached to each other. Then, a liquid crystal material is injected between the substrates by gas pressure after evacuating the interspace therebetween. Thus, the GH liquid crystal display device is fabricated.

Although the thickness of the liquid crystal layer 5 (cell gap) is set to be about 5 $\mu$m in the present example, the thickness is not limited thereto. In fact, the thickness can take any value as long as sufficient absorption of light and a practical response rate can be achieved. Typically, the thickness is about 2 to 15 $\mu$m.

Moreover, in order to achieve uniform orientation of the liquid crystal molecules in the presence of an applied voltage, the liquid crystal molecules need to be slightly tilted from the surface of the substrate. It is well known that this so-called "pretilt angle" can be controlled by modifying the rubbing condition.

The GH liquid crystal material is prepared as follows. About 1 to 5 wt % of several types of azo-containing and anthraquinone-containing dichroic dyes is added to a host liquid crystal material ("ZL1-4792": Merck & Co., Inc.), while the hue is adjusted so as to allow for a black-and-white display. Moreover, in order to give the liquid crystal material a spontaneous twist, several wt % of an optically active substance ("S-811": Merck & Co., Inc.) is added to the liquid crystal material, while the ratio d/p of the pitch p and the cell gap d is adjusted so as to be approximately 0.5.

The ratio d/p is not limited to the above value. In the present example, for example, d/p can take any value within the range from about 0.42 to about 0.91. Depending on the type of the alignment film or the liquid crystal material, however, stripe domains may occur when the value of d/p is too large, whereby a satisfactory display cannot be realized. Therefore, it is necessary to check in advance the critical d/p margin for the liquid crystal material used and the material for the alignment film used, and to adjust the ratio of the cell thickness and the spontaneous pitch of the liquid crystal material.

The dye concentration is set based on FIG. 1. Since the order parameter of the GH liquid crystal material used in the present example is about 0.76, the value $K_M cd$ is set to be about 2.7 favoring brightness over contrast. The reflective GH liquid crystal display device thus fabricated exhibits considerably high brightness and contrast with brightness of about 46% and contrast of about 4.0 in the presence of an applied voltage. It should be noted that the above brightness is calculated from the reflectance observed with the reflector alone.

In the present example, the GH display mode having a twisting angle of about 240° is employed so as to be capable of displaying images with a plurality of grey levels while achieving sufficient brightness and contrast. However, the twisting angle is not limited thereto.

Moreover, a substrate on which no active element is provided is used as the substrate 1a in the present example. However, it is apparent that a great volume of information can be displayed by combining the present example with an active element such as a TFT or MIM.

Furthermore, although only a black-and-white display has been discussed in the present example, it is apparent that a color display can be realized by combining the present example with a known micro color filter.

As described above, according to the present invention, the reflective liquid crystal display device is designed so that the product $K_M cd$ of the value $K_M$, the dye concentration c % and the thickness of the liquid crystal layer d $\mu$m satisfies the aforementioned relationship. Therefore, a display with high brightness and high contrast can be realized. Moreover, by specifying the range of physical property values with which the optimal brightness and high contrast can both be realized, there is provided an increased freedom in designing the reflective liquid crystal display device, thereby facilitating such designing.

Furthermore, by adding the chiral material to the liquid crystal material, it is possible to realize a display with even higher contrast since light can be more efficiently absorbed in the absence of an applied voltage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device comprising:

a pair of substrates; and a liquid crystal layer interposed between the pair of substrates, where the liquid crystal layer is formed of a liquid crystal material having a positive dielectric constant anisotropy, long axis of molecules of the liquid crystal material near the substrate is substantially parallel to the substrate, and the liquid crystal material contains a dichroic dye mixed therein, wherein a product $K_M cd$ of a value $K_M$, a dye concentration c % and a thickness of the liquid crystal layer d $\mu$m is set so as to satisfy $$3.0S^2 - 7.3S + 5.7 \leq K_M cd \leq 14.7S^2 - 15.1S + 6.15$$

where the value $K_M$ is expressed as $$K_M = 3k_1/(1+2S)$$

or $$K_M = 3k_2/(1-S),$$

where $k_1$ denotes an absorption coefficient for linearly-polarized light substantially parallel to the liquid crystal molecules; and $k_2$ denotes an absorption coefficient for linearly-polarized light substantially perpendicular to the liquid crystal molecules; and S denotes an order parameter of the liquid crystal material containing the dichroic dye mixed therein, and where an effective value of a voltage applied across the liquid crystal layer is in a range of about 0 to 5 V.

2. A reflective liquid crystal display device according to claim 1, wherein a chiral material spontaneously having a twisted structure is added to the liquid crystal material, whereby the liquid crystal layer has a twisted structure.

\* \* \* \* \*